United States Patent [19]

Riggs

[11] 4,276,104
[45] Jun. 30, 1981

[54] TRANSFER DRUM APPLICATION OF NARROW STRIP COMPONENTS TO A TIRE BEING BUILT ON A TIRE BUILDING DRUM

[75] Inventor: Robert S. Riggs, Stow, Ohio
[73] Assignee: The Goodyear Tire & Rubber Company, Akron, Ohio
[21] Appl. No.: 111,155
[22] Filed: Jan. 11, 1980
[51] Int. Cl.³ .................................................. B29H 17/20
[52] U.S. Cl. ............................ 156/123 R; 156/133; 156/361; 156/405 R
[58] Field of Search .................. 156/123 R, 133, 361, 156/394 R, 405 R, 406

[56] References Cited

U.S. PATENT DOCUMENTS

| | | | |
|---|---|---|---|
| 3,841,941 | 10/1974 | Leblond et al. | 156/133 |
| 3,844,871 | 10/1974 | Habert et al. | 156/133 |
| 4,155,789 | 5/1979 | Wireman et al. | 156/130 |
| 4,206,009 | 6/1980 | Kazares | 156/130 |

Primary Examiner—John E. Kittle
Attorney, Agent, or Firm—T. P. Lewandowski

[57] ABSTRACT

A pair of transfer drums arranged to move to and away from nip-forming relation with a tire building drum on which a tire is being built operate to save building time. Individual strip appliers place two strip components on each transfer drum while the main carcass ply is being wrapped on the building drum. The strip components are together then transferred rapidly and effectively to the tire. The foregoing abstract is not to be taken as limiting the invention of this application, and in order to understand the full nature and extent of the technical disclosure of this application, reference must be made to the accompanying drawing and the following detailed description.

7 Claims, 4 Drawing Figures

TRANSFER DRUM APPLICATION OF NARROW STRIP COMPONENTS TO A TIRE BEING BUILT ON A TIRE BUILDING DRUM

The present invention relates to building tires and particularly to a method and apparatus for applying a plurality of pairs of tire building strip components to a tire carcass under construction on a tire building drum.

According to one particular aspect of the invention, there is provided a method of building a tire on a cylindrical building drum, comprising wrapping an inner liner about the drum, wrapping a cord or wire-reinforced ply about the inner liner, applying a first pair of parallel axially spaced strip components to the cylindrical surface of transfer means positioned parallel to and in axial register with the building drum but spaced radially therefrom, applying a second pair of parallel axially spaced strip components to said transfer means so as to locate a leading end of each of the second pair at an angular location spaced from the leading end of the respectively associated components of the first pair and so as to adhere the remaining lengths of the second pair to the radially outward surfaces of the first pair, the first-mentioned applying step being initiated before the termination of the later mentioned wrapping step, then rotating the transfer means angularly to position the trailing ends of said second pair of components in a nip to be formed by moving the transfer means radially toward the building drum, moving said transfer means radially toward the building drum to form said nip, and rotating together the transfer means and the building drum so as to transfer the two pairs of strip components from the transfer means to the building drum.

According to one aspect of the invention, there is provided an apparatus for applying a plurality of tire building components to a tire being built on a tire building drum mounted for rotation about an axis, the apparatus comprising transfer means including a pair of drums mounted parallel to said axis in axial registry with said building drum and having a diameter of from 1.4 to 2 times the diameter of said building drum, means mounting said transfer means for movement in a plane which is normal to said axis from a first position wherein said drums are juxtaposed to said building drum in nip-forming relation therewith and a second position apart from said building drum, first and second applier means respectively for applying first and second tire building components to said drums, moving means associated respectively with said first and said second applier means respectively to move the same in directions parallel to said plane to component transferring relation with said drums in the second position thereof and away from said drums, and control means including a digital encoder connected to said drums and operable to actuate said first applier means in response to a first angular displacement of said drums while said drums are in said second position thereof and to actuate said second applier means in response to a second angular displacement of said transfer drum to superimpose a part of the length of each second component respectively on each first component lying on the respective drum of the transfer means while in the said second position thereof.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figure 1:
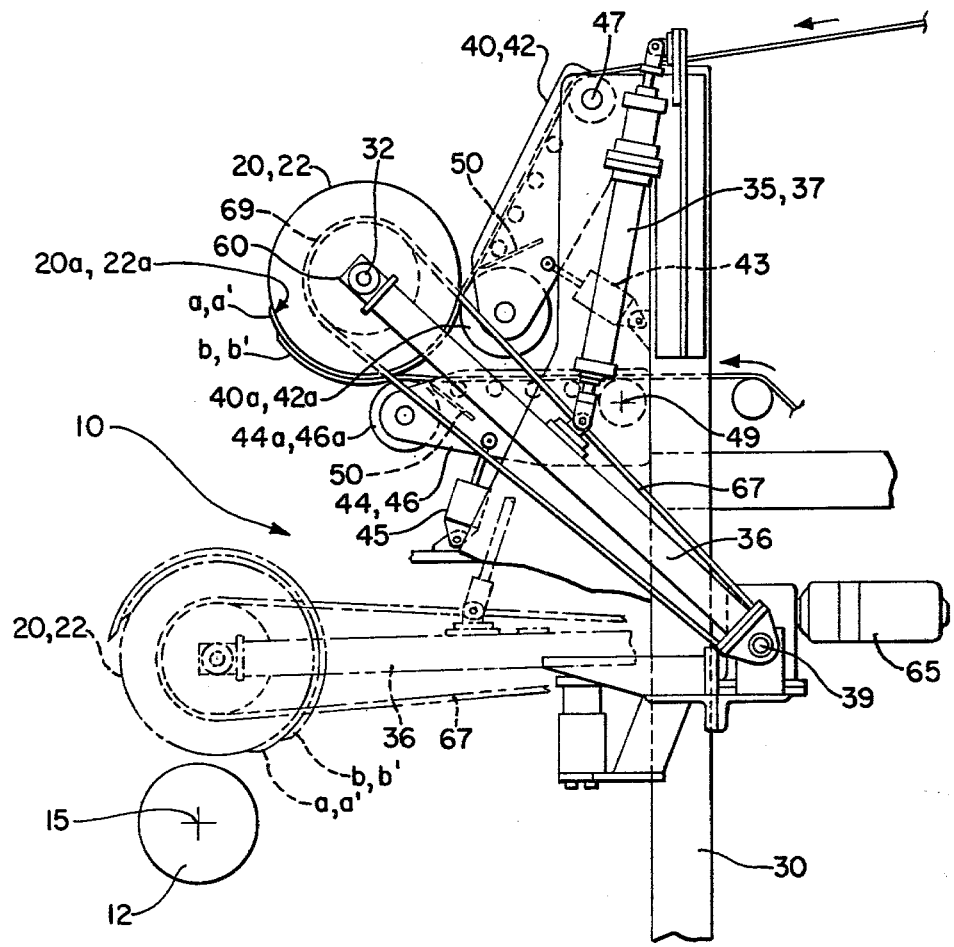
FIG. 1 is a schematic view in side elevation of an apparatus embodying the present invention.
Figure 2:
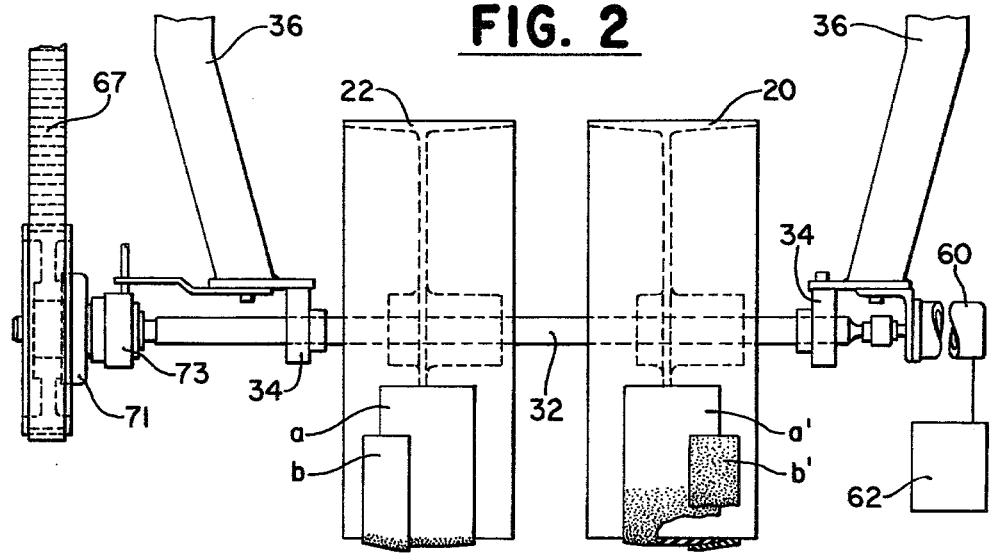
FIG. 2 is a partial view in front elevation of the apparatus of FIG. 1.
Figure 3:
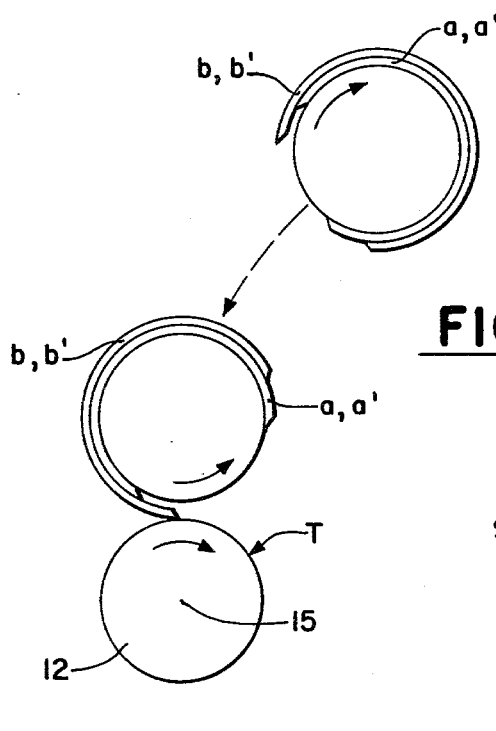
FIGS. 3 and 4 are schematic views in side elevation illustrating the operations of the apparatus of FIGS. 1 and 2.

Referring now to the apparatus 10 illustrated schematically in FIGS. 1 and 2, there is included a tire building drum 12 of any suitable type which is rotatable about its own axis 15 to facilitate the wrapping successively thereabout of a plurality of components including an inner liner the width of which corresponds to or exceeds the axial length of the drum and a cord or wire-reinforced ply the width of which is also equal to or greater than the axial width of the tire building drum.

The liner and the ply are wrapped about the building drum in any suitable manner, preferably by mechanical devices not illustrated in the drawings in the course of constructing a tire T on the drum 12.

The wrapping of the liner and the wrapping of the reinforced ply about the drum constitute significant portions of the time required to complete a single tire T being built on the building drum.

In order to improve the manufacturing efficiency of the tire building time cycle, the presently described methods and apparatus have been developed for the application of pairs of components in the form of narrow strips which are respectively to be applied circumferentially about the tire being built at axially predetermined locations. The strips of the or each respective pair are spaced apart axially of the tire, usually being equally spaced with respect to a mid-circumferential plane of the tire.

In the present embodiments, two notable advantages are obtained. The respective pairs of strips, such as sidewalls, chafers, or other pairs of components in strip form, are applied simultaneously. Secondly, two pairs of the selected strip components are applied almost simultaneously.

The plurality of pairs of strips a,a' and b,b' are first applied to a pair of transfer drums 20,22 as in FIG. 2, the applying step being initiated before the termination of the wrapping of the cord or wire-reinforced ply about the building drum, and remain on the transfer drums to be promptly applied about the building drum immediately following the completion of the wrapping of the cord or wire-reinforced ply thereabout. Thus, little or no additional time is required in the total time cycle for the application of the respective strip components, since they can be applied to the tire being built with little more than one revolution of the building drum.

The apparatus of FIGS. 1 and 2 includes a vertically extending frame 30 spaced from the tire building drum and accommodating suitable means (not shown) for rotatably mounting a plurality of supply spools each having an indefinite running length respectively thereon of selected tire building strip components. The transfer drums are provided with a shaft 32 rotatable in bearings 34 supported at the ends of a pair of swing arms 36 pivotally attached to the frame so as to maintain the transfer drums in fixed axial registry with the axial width of the building drum 12 but enabling the transfer drums to be moved between the solid line position as seen in FIG. 1, and a dotted line position, such that the transfer drums can form nips with the tire T being built on the building drum.

To move the transfer drums between their first and second positions, actuating means such as the operating cylinders 35,37 are connected between the frame and the respective arms 36 so as to swing the arms in timed relation about a pivot axis 39.

To apply the respective pairs of strip components to the transfer drums, a first pair of appliers 40,42 of any suitable construction are mounted on the frame in such a manner that the rollers 40a, 42a can be swung toward and away from the circumferential surfaces of the transfer drums.

A second pair of appliers 44,46 of identical or similar design are mounted in a similar manner on the frame so as to position the rollers 44a,46a toward or away from the peripheries of the transfer drums.

For moving the respective appliers relatively of the associated drums 20,22, the apparatus provides moving means such as the operating cylinders 43,45 suitably connected to swing the appliers about their respective axes 47,49.

To cut the respective strip components to appropriate length so that the respective ends of each component can be abutted to form a splice which is oriented at an acute angle relative to the radial plane of the tire through such splice, each of the appliers is provided with a shear device 50 which can be operated in response to signals received from a control device 62 which is connected to a digital rotation encoder 60 corotatably connected to the shaft 32 and capable of measuring the respective lengths of the strip components by counting discrete increments of rotation of the transfer drums. A count of the discrete increments of angular displacement is received in the control device and accumulated independently with respect to the length being measured of each of the strip components.

Precise regulation of the rotation of the transfer drum is provided by a drive means including a motor 65 driving a positive drive belt 67 wrapped on the drive pulley 69 corotatably mounted at the end of the shaft 32. The drive means also includes a clutch 71 and brake 73 each of which is operated in response to the control device as presently will be made more apparent.

To initiate the operation in accordance with the present method, the transfer drums are rotated to a predetermined initial or zero angular position in response to a signal from the control device. Each of the first pair of appliers is then moved to cause the rollers 40a, 42a to press toward the drums 20,22 to attach the leading ends of the first pair a,a' of strip components to the surface of the respective transfer drums. The surface of each drum at the point of attachment of the first leading end can be and preferably is provided with at least one port 20a,22a which is connected to a suction device (not shown) so as to insure the positive location and retention of the leading end of each of the strips of the first pair thereof.

The transfer drums are then rotated clockwise, as seen in FIG. 1, increments of rotation being counted and accumulated by the encoder 60 and the control device 62.

In response to the acquisition by the encoder of a predetermined number of increments of angle of rotation of the transfer drums, the drum is stopped and the second pair of appliers moved to press the leading ends of the second pair b,b' of strip components into adherent contact with the respectively associated strip components of the first pair in such a manner that the leading ends thereof are spaced behind the leading ends of the first pair by a predetermined circumferential distance. The axial locations of the respective strips are predetermined by the respective axially spaced positions of the appliers which are made suitably adjustable for the purpose.

Rotation of the transfer drum is resumed as is the measurement of the length of the first pair of strips and the measurement of length of the second pair of strips is begun in a like manner by counting discrete increments of angular displacement of the transfer drums.

Upon acquiring a predetermined number of discrete increments counted in the control device, the transfer drums are again stopped and the shearing devices are actuated in the associated appliers so as to cut the predetermined length of each of the first pair of strips at the desired acute angle.

Rotation of the transfer drum is resumed, continuing the measurement of the length of the second pair of strip components until again a predetermined number of count of increments is acquired in the control device whereupon the transfer drum rotation is again stopped and the strip components of the second pair cut to length in the same manner by the shearing devices. The transfer drums are then rotated so as to position the trailing ends of the second pair of strip components, which on the transfer drum lie outwardly radially of the first pair, to an angular position such that the trailing ends will be placed in the nips formed by moving the transfer drums radially toward the tire being built on the building drum.

Then the transfer drums and the building drum are rotated together so as to transfer the two pairs of strip components from the transfer drum to the tire being built.

Figure 4:
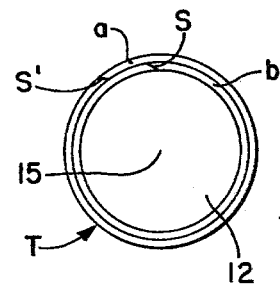

The two pairs of strips are held in readiness on the transfer drums so that the transfer drums can be placed in nip contact with the tire carcass being built immediately after completion of wrapping of the cord or wire-reinforced ply thereon and laid about the tire by little more than a single revolution of the tire building drum. The two pairs of strip components are transferred by preferential adhesion each to form a single circularly continuous component having its respective ends abutted to form a splice S,S' oriented at the desired acute angle as can be seen in FIG. 4.

The transfer drums in particular in the present embodiment occupy relatively less space than heretofore required for the application of strip components separately or even in single pairs. The drum diameter preferably is from 1.4 to 2 times the diameter of the building drum and in the particular embodiment being described is about 1.6 times the building drum diameter.

Moreover, by placing the strip components together on the transfer drums, while the liner and ply are being wrapped about the building drum, and in superimposed relation, the time used in building the complete tire is reduced, without any sacrifice of quality.

What is claimed is:

1. A method of building a tire on a cylindrical building drum, comprising:
   wrapping an inner liner about the drum, wrapping a cord or wire-reinforced ply about the inner liner, applying a first pair of parallel axially spaced strip components to the cylindrical surface of transfermeans positioned parallel to and in axial register with the building drum but spaced radially therefrom, applying a second pair of parallel axially spaced strip components to said transfer means so as to locate a leading end of each of the second pair at an angular location spaced from the leading end of the respectively associated components of the first pair and so as to adhere the remaining lengths of the second pair to the radially outward surfaces of the first pair, the first-mentioned applying step being initiated before the termination of the later mentioned wrapping step, then rotating the transfermeans angularly to position the trailing ends of said second pair of components in a nip to be formed by moving the transfermeans radially toward the building drum, and moving said transfermeans radially toward the building drum to form said nip, and rotating together the transfermeans and the building drum so as to transfer the two pairs of strip components from the transfer means to the building drum.

2. A method as claimed in claim 1, comprising initiating application of the second pair of strip components before completing the application of the first said pair.

3. A method as claimed in claim 1, comprising:
measuring the length of the first pair by counting discrete increments of angle of rotation of the transfer means and initiating application of the second pair in response to acquisition of a predetermined number of said discrete increments of angle of rotation of the transfer means.

4. A method as claimed in claim 1, 2, or 3, comprising measuring the length of the second pair while continuing to measure the length of the first pair and cutting the first pair to length in response to acquisition of a predetermined number of increments acquired in measurement of the length of the first pair and cutting to length the second pair in response to the acquisition of a predetermined number of increments of measurement of the second pair.

5. A method as claimed in claim 4, said cutting to length of each of said components being effected at an acute angle with respect to the length of such component so that the respective cut ends of each component abut at a splice oriented at an acute angle relative to a radial plane of the tire through such splice.

6. An apparatus for applying a plurality of tire building components to a tire being built on a tire building drum mounted for rotation about an axis, the apparatus comprising:
transfer means including a pair of drums mounted parallel to said axis in axial registry with said building drum and having a circumference of from 1.4 to 2 times the diameter of said building drum;
means mounting said transfer means for movement in a plane which is normal to said axis from a first position wherein said drums are juxtaposed to said building drum in nip-forming relation therewith and a second position apart from said building drum;
first and second appliermeans respectively for applying first and second tire building components to said drums;
moving means associated respectively with said first and said second appliermeans respectively to move the same in directions parallel to said plane to component transfering relation with said drums in the second position thereof and away from said drums;
and control means including a digital encoder connected to said drums and operable to actuate said first applier means in response to a first angular displacement of said drums while said drums are in said second position thereof and to actuate said second applier means in response to a second angular displacement of said transfer drum to superimpose a part of the length of each second component respectively on each first component lying on the respective drum of the transfer means while in the said second position thereof.

7. Apparatus for applying a plurality of tire building components to a tire carcass under construction on a tire building drum mounted for rotation about an axis, said apparatus comprising:
a frame, a plurality of tire building component appliers each associated respectively with a single one of said tire building components;
a pair of transfer drums having a shaft fixed therein and mounted for rotation about an axis, the transfer drums having like circumferences of from 1.4 to 2 times the circumference of said building drum;
a pair of swing arms swingably attached to said frame and having at the distal ends thereof a pair of bearings rotatably supporting said shaft;
driving and braking means mounted on said shaft, respectively to rotate and to stop rotation of said transfer drums;
means operable to swing said swing arm to position said transfer drums selectively in two positions, in the first of which positions the transfer drums are urged to nip-forming relation with said building drum and the second of which positions is a loading position spaced from said building drum;
said appliers each having actuating means for moving at least a portion of the respective applier into component transferring relation with the associated transfer drum and away from the same while said transfer drums are in said loading position and cut-off means operable to cut a predetermined length of each respective component;
control means including a rotation encoder connected to said shaft to be operated thereby and to count discrete increments of rotation of the transfer drum;
and means responsive to said control means for actuating said driving and braking means in response to successive angular displacements of said transfer drums so as to space respective lengths of said components at predetermined angular increments of rotation about the transfer drums in superimposed relation thereon.

* * * * *